US012784404B2

(12) United States Patent
Sangappa et al.

(10) Patent No.: US 12,784,404 B2
(45) Date of Patent: Nov. 3, 2026

(54) MACROSCOPIC FINGERPRINTING

(71) Applicant: Entrupy, Inc., New York, NY (US)

(72) Inventors: Hemanth Kumar Sangappa, Bangalore (IN); Aman Jaiswal, Kasia (IN); Akhilesh Yadav, Ghazipur (IN); Pratik Likhar, Bangalore (IN); Ashlesh Sharma, Redmond, WA (US)

(73) Assignee: Entrupy, Inc., New York, NY (US)

( * ) Notice: Subject to any disclaimer, the term of this patent is extended or adjusted under 35 U.S.C. 154(b) by 117 days.

(21) Appl. No.: 18/721,077

(22) PCT Filed: Dec. 15, 2022

(86) PCT No.: PCT/US2022/053078
§ 371 (c)(1),
(2) Date: Jun. 17, 2024

(87) PCT Pub. No.: WO2023/114435
PCT Pub. Date: Jun. 22, 2023

(65) Prior Publication Data

US 2025/0259417 A1 Aug. 14, 2025

(30) Foreign Application Priority Data

Dec. 15, 2021 (IN) ............................. 202121058401

(51) Int. Cl.
*G06V 10/75* (2022.01)
*G06V 10/25* (2022.01)
(Continued)

(52) U.S. Cl.
CPC ............ *G06V 10/751* (2022.01); *G06V 10/25* (2022.01); *G06V 10/267* (2022.01); *G06V 10/34* (2022.01);
(Continued)

(58) Field of Classification Search
CPC .... G06V 10/751; G06V 10/25; G06V 10/267; G06V 10/34; G06V 10/7715;
(Continued)

(56) References Cited

U.S. PATENT DOCUMENTS

2012/0051605 A1* 3/2012 Nagar .................. G06V 40/113
382/124
2012/0243797 A1† 9/2012 Di Venuto Dayer
(Continued)

OTHER PUBLICATIONS

Jiaming Sun, Zehong Shen, Yuang Wang, Hujun Bao, Xiaowei Zhou. LoFTR: Detector-Free Local Feature Matching with Transformers. 2021. Computer Vision and Pattern Recognition (cs.CV); https://doi.org/10.48550/arXiv.2104.00680, pp. 1-10 (Year: 2021).*
(Continued)

*Primary Examiner* — Delomia L Gilliard
(74) *Attorney, Agent, or Firm* — Cognition IP, P.C.; Edward Steakley; Rajesh Fotedar

(57) ABSTRACT

Various embodiments of an apparatus, methods, systems and computer program products described herein are directed to a Fingerprint Engine that registers a reference image portraying a physical instance of an object. The Fingerprint Engine captures a query image portraying a physical instance of a target object. The Fingerprint Engine compares the reference image and the query image. The Fingerprint Engine determines an authenticity of the target object based on detecting a match between the reference image and the query image.

20 Claims, 6 Drawing Sheets

(51) Int. Cl.

| | |
|---|---|
| ***G06V 10/26*** | (2022.01) |
| ***G06V 10/34*** | (2022.01) |
| ***G06V 10/77*** | (2022.01) |
| ***G06V 10/98*** | (2022.01) |
| ***G06V 20/00*** | (2022.01) |

(52) U.S. Cl.
CPC ........ *G06V 10/7715* (2022.01); *G06V 10/993* (2022.01); *G06V 20/95* (2022.01)

(58) Field of Classification Search
CPC ...... G06V 10/993; G06V 20/95; G06V 10/24; G06V 10/26; G06V 10/454; G06V 10/50; G06V 10/62; G06V 10/757; G06V 10/764; G06V 10/82; G06V 20/40; G06V 20/64; G06V 20/80; G06T 7/001
See application file for complete search history.

(56) References Cited

U.S. PATENT DOCUMENTS

| | | | | |
|---|---|---|---|---|
| 2014/0209686 | A1 | 7/2014 | Hanina | |
| 2016/0227133 | A1* | 8/2016 | Jones | H04N 23/64 |
| 2017/0262996 | A1* | 9/2017 | Jain | G06V 10/82 |
| 2017/0344823 | A1 | 11/2017 | Withrow et al. | |
| 2018/0349695 | A1 | 12/2018 | Le Henaff | |
| 2020/0210768 | A1* | 7/2020 | Turkelson | G06T 7/0002 |
| 2021/0117984 | A1 | 4/2021 | Sharma et al. | |
| 2021/0295077 | A1 | 9/2021 | Ross et al. | |

OTHER PUBLICATIONS

Extended European Search Report received in European application No. 22908463.7, mailed on Oct. 24, 2025.

Pahlberg, Tobias, Olle Hagman, and Matthew Thurley. "Recognition of boards using wood fingerprints based on a fusion of feature detection methods." Computers and Electronics in Agriculture 111 (2015): 164-173.

International Search Report and Written Opinion of the International Search Authority in international application No. PCT/US2022/053078, mailed Mar. 21, 2023.

Sun, Jiaming, et al. "LoFTR: Detector-free local feature matching with transformers." Proceedings of the IEEE/CVF conference on computer vision and pattern recognition. 2021.

* cited by examiner
† cited by third party

MACROSCOPIC FINGERPRINTING

CROSS-REFERENCE TO RELATED APPLICATIONS

This application is a 35 U.S.C. § 371 U.S. National Stage application of International Application No. PCT/US2022/053078, filed on Dec. 15, 2022, which claims the benefit of Indian patent application Ser. No. 202121058401, filed on Dec. 15, 2021, which are hereby incorporated by reference in their entirety.

BACKGROUND

Global counterfeiting of products is a serious problem. For high-end luxury items, like leather products, watches, apparel, antiques, art, etc., this problem presents a serious challenge to manufacturers and well-known brands. Apart from being high-valued, these products (or goods) are also most sought after, making them more susceptible to counterfeiting. As protection against counterfeiting, the brands require that every product be uniquely identifiable.

SUMMARY

Luxury brands generally use several naturally occurring (sometimes processed formed) materials in their products, such as leather for example. The surfaces of these materials have uniquely identifiable textures. Further, these products may also be handmade. Even if the products are machine manufactured, the manufacturing process leaves behind unique traces on the surface of each individual instance of the product.

Various embodiments of a Fingerprint Engine are disclosed herein determines a digital fingerprint of a physical instance of a type of product (i.e. type of object, type of good). The Fingerprint Engine further performs comparison between the digital fingerprint and an image of a target object in order to determine whether the target object is, in actuality, the same object instance that corresponds with the digital fingerprint. Various embodiments of the Fingerprint Engine thereby an individual customer to establish the authenticity of a physical instance of a certain type of object currently in possession of the individual customer.

Various embodiments of an apparatus, methods, systems and computer program products described herein are directed to a Fingerprint Engine that registers a reference image portraying a physical instance of an object. The Fingerprint Engine captures a query image portraying a physical instance of a target object. The Fingerprint Engine compares the reference image and the query image. The Fingerprint Engine determines an authenticity of the target object based on detecting a match between the reference image and the query image. When determining an authenticity, the Fingerprint Engine determines a Fingerprint-FP of that target object. Various embodiments disclosed herein may also involve generating a Fingerprint-FP od the object as well.

One or more embodiments of the Fingerprint Engine may implement a Registration Phase and a Compare Phase. During the Registration Phase, an image of the prescribed region of a physical instance of a type of object may be captured via a camera(s) of a mobile computer device (such as a smartphone) and a Fingerprint Engine mobile device software application. The Fingerprint Engine thereby stores a registered image of that physical instance of a type of object generated by the Registration Phase. The registered image may then be used as a reference image in the Compare Phase.

In some embodiments, a first portion of the Fingerprint Engine may be a smartphone-based software application which can be used by the end customer (i.e. end-user) with ease. A second portion of the Fingerprint Engine may be a cloud-based system. In some embodiments, blur detection for generic object registration and segmentation plus blur detection for defined object registration may be performed by the Fingerprint Engine via the smartphone-based software application. The Fingerprint Engine stored registration images in the cloud-based system.

In some embodiments, translucent image (using the registered image) generation and coarse alignment for generic object comparison may be performed by the Fingerprint Engine via the smartphone-based software application. In some embodiments, translucent image generating, coarse alignment and segmentation for defined object comparison may be performed by the Fingerprint Engine via the smartphone-based software application. In some embodiments, the translucent image may be a translucent overlay of the registration image.

In some embodiments, fine alignment, feature extraction and match scoring for generic object comparison may be performed by the Fingerprint Engine in the cloud-based system. In some embodiments homography estimation, alignment, feature extraction, and match scoring for defined object comparison may be performed by the Fingerprint Engine in the cloud-based system.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

In this specification, reference is made in detail to specific embodiments. Some of the embodiments or their aspects are illustrated in the drawings.

DETAILED DESCRIPTION

Figure 1:
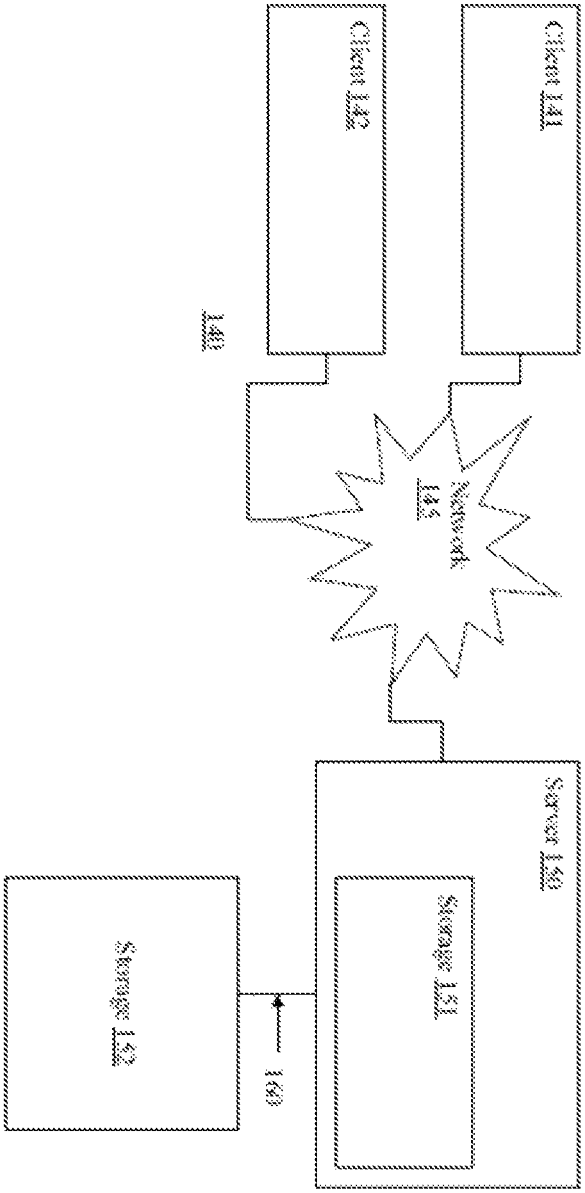
FIG. 1 is a diagram illustrating an exemplary environment in which some embodiments may operate.

In this specification, reference is made in detail to specific embodiments. Some of the embodiments or their aspects are illustrated in the drawings.

It is understood that any discussion, description, elaboration and illustration included herein may be represented in whole or at least in part by data and may be embodied and/or processed according to one or more computer software modules and/or computer hardware modules.

Additionally, any discussion, description, elaboration and illustration included herein may be implemented on a non-transitory computer readable medium, a computer system and/or a computer program product. In addition, any portion and any feature included in any discussion, description, elaboration and illustration included herein may be further be represented as data.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

A diagram of exemplary network environment in which embodiments may operate is shown in FIG. 1. In the exemplary environment 140, two clients 141, 142 are connected over a network 145 to a server 150 having local storage 151. Clients and servers in this environment may be computers. Server 150 may be configured to handle requests from clients.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151. In another embodiment, the server 150 may respond to requests and store the file with a specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a end-user may store a file in the "cloud," which means that the file is stored on a remote network resource though the actual hardware storing the file may be opaque to the end-user.

Figure 2:
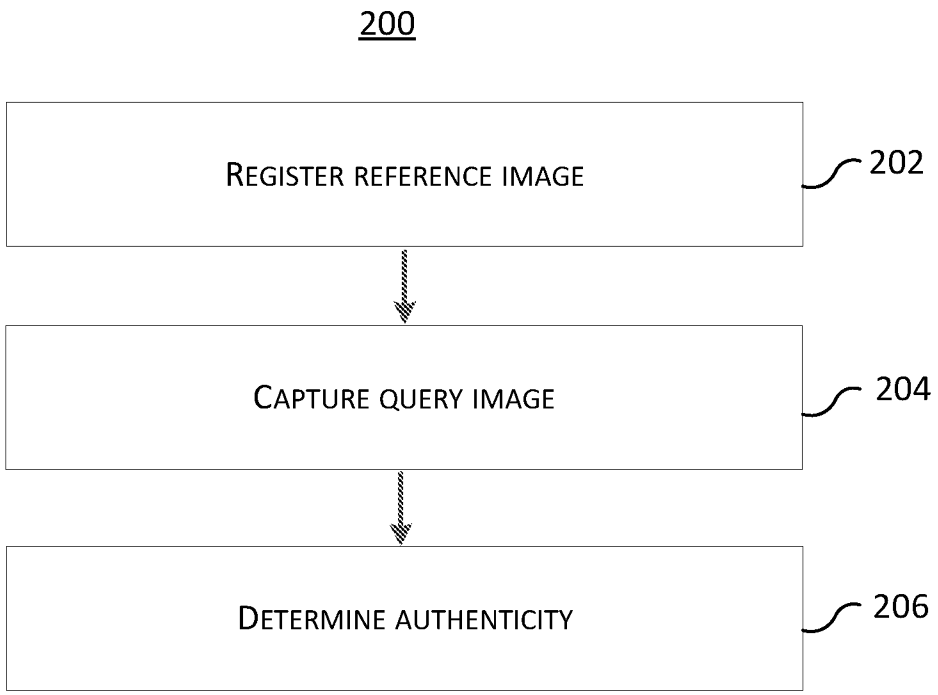
FIG. 2 is a diagram illustrating an exemplary method that may be performed in some embodiments.

As shown in flowchart 200 of FIG. 2, the Fingerprint Engine that registers a reference image portraying a physical instance of an object. (Step 202) The Fingerprint Engine captures a query image portraying a physical instance of a target object. (Step 204) The Fingerprint Engine compares the reference image and the query image. The Fingerprint Engine determines an authenticity of the target object based on detecting a match between the reference image and the query image. (Step 206)

Figure 3:
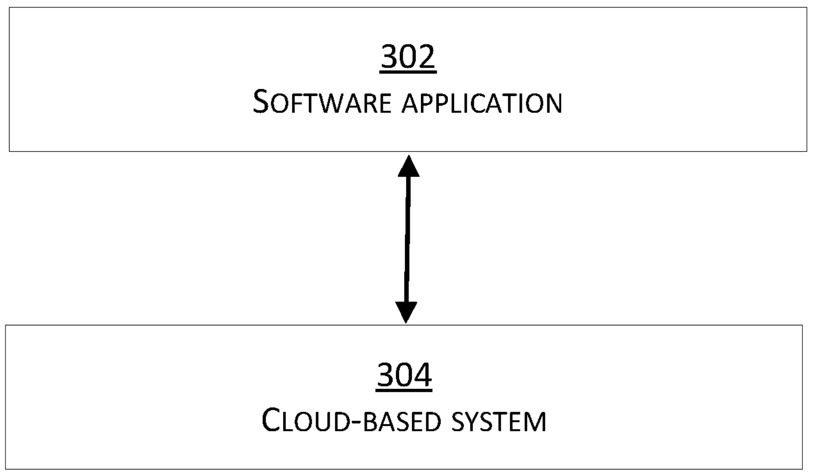
FIG. 3 is a diagram illustrating an exemplary environment in which some embodiments may operate.

As shown in FIG. 3, the Fingerprint Engine may be concurrently deployed via a software application 302 and via a cloud-based system 304. The software application 302 and the cloud-based system 304 transmitted data to each other with respect to executing, completion and/or reporting of one or more operations of the Fingerprint Engine. As such, the software application 302 may be a front-end portion of the Fingerprint Engine and the cloud-based system 304 may be a back-end portion of the Fingerprint Engine. In some embodiments, the software application 302 may be a mobile device software computer application.

In various embodiments, one or more modules of the Fingerprint Engine may be implemented via the software application 302. Portions of one or more modules of the Fingerprint Engine may be implemented via the software application 302. One or more operations of the Fingerprint Engine may be executed via the software application. Portions of one or more operations of the Fingerprint Engine may be executed via the software application 302.

In various embodiments, one or more modules of the Fingerprint Engine may be implemented via cloud-based system 304. Portions of one or more modules of the Fingerprint Engine may be implemented via the cloud-based system 304. One or more operations of the Fingerprint Engine may be executed via the cloud-based system 304. Portions of one or more operations of the Fingerprint Engine may be executed via the cloud-based system 304.

Registration Phase: Blur Detection and Segmentation

Figure 4:
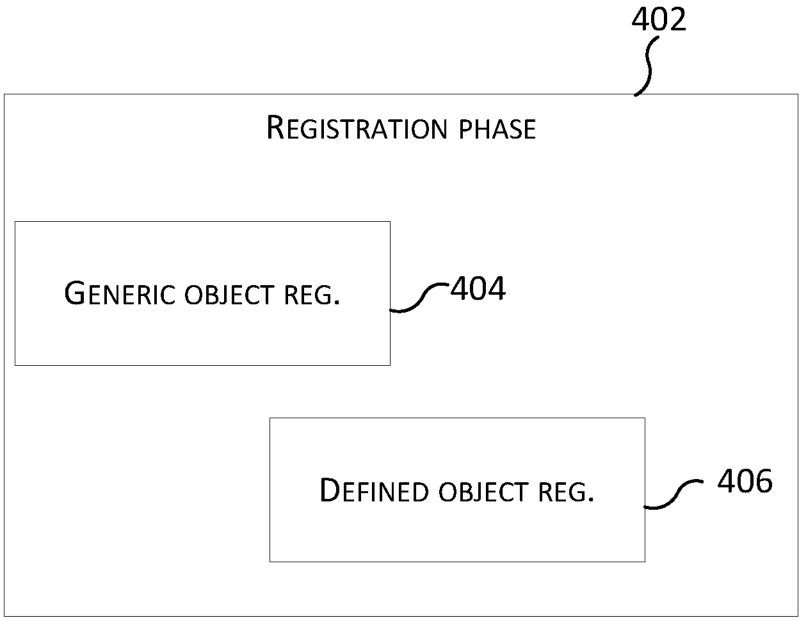
FIG. 4 is a diagram illustrating an exemplary environment in which some embodiments may operate.

The Fingerprint Engine executes blur detection and segmentation in the Registration Phase 402. As shown in in FIG. 4, there are two different pipelines for the Registration Phase 402, a first registration pipeline for generic object image registration ("generic object registration") 404 and a second registration pipeline for defined object image registration ("defined object registration") 406. It is understood that a defined object is a type of object that has a particular and expected shape (or dimensions) that is known. For example, a defined object may be a watch or a baseball. Blur detection is executed for generic object registration 404. Segmentation plus blur detection is executed for defined object registration 406.

For the generic object registration 404 pipeline of the Registration Phase 402, the Fingerprint Engine implements a machine learning ("ML") model for blur detection. For example, the machine learning model may be a MobileNet V2 model. As the end-user attempts to capture an image of the object via the mobile computer device, the Fingerprint Engine attempts to detect blurring of the image of the object before the actual image of the target object is captured. Blurring of the image may occur due to the end-user currently placing the mobile device either too close or too far away from the object.

For blur detection, the Fingerprint Engine continually monitors an extent of blurring in the preview image on the mobile computer device. For example, as the end-user attempts to physically position the camera(s) of the mobile computer device proximate to the object, a video feed is generated that includes multiple images. Each one of the image of the video feed may be considered a preview image. That is, a preview image is a portrayal of an object in a frame of the video feed before image capture. In real-time, the Fingerprint Engine continually determines and updates a blur score, indicating a current extent of blurring portrayed in the preview image.

Upon determining a current blur score is within an acceptable blur score range, the Fingerprint Engine prompts the end-user that the preview image is representative of an acceptable image suitable for registration. Based on receipt of the prompt, the end-user may capture the image of the object. The captured image of the object is transmitted to the Fingerprint Engine, where it is stored as a registration image for the object.

For the defined object registration 406 pipeline of the Registration Phase 402, the Fingerprint Engine executes the additional step of segmentation before also executing blur detection. The defined object registration 406 pipeline is executed as the end-user attempts to capture an image of the object via the camera(s) of the mobile computer device. In various embodiments, a segmentation ML model of the Fingerprint Engine may be implemented on the mobile computer device for the defined object registration pipeline.

As the end-user attempts to capture an image of the object via the camera(s) of the mobile computer device, the Fingerprint Engine feeds the preview image into the segmentation ML model. The segmentation ML model returns segmentation output that portrays a shape of a region of interest of the object. For example, if the object is a watch, the region of interest may be the bezel and lugs and may not include the watch straps. As such, the segmentation output may be a template (or a segmentation mask) defined according to the region of interest. For example, the segmentation output for an object that is a watch may be a silhouette of the shape of the bezel and lugs.

The end-user may use the segmentation output as a template as the end-user attempts to capture the image of the object. The Fingerprint Engine continually monitors a current alignment between the template and the preview image of the object. The Fingerprint Engine continually determines a dice coefficient based on the current placement of the template with regard to the preview image of the object. The Fingerprint Engine prompts the end-user that the template is properly aligned with the preview image of the object upon determining the current dice coefficient is within a dice coefficient threshold. Based on receipt of the prompt, the end-user may capture the image when it is properly aligned with the template. The Fingerprint Engine receives the captured image of the object and executes blur detection on that captured image.

After blur detection, the Fingerprint Engine stores the image as a registration image for the object. It is understood that storing of a registration image during either pipelines of the Registration Phase 402 may include extraction of features of the registration image. In some embodiments, storage of the registration image and feature extraction may be executed at a cloud-based system of the Fingerprint Engine, which is remote from the mobile computer device at which registration image capture was performed.

Compare Phase: Coarse Alignment, Temporal Smoothing & Homography Estimation

During the Compare Phase, an end-user may seek to determine the authenticity of a physical instance of a target object ("target object") currently in their possession. To do so, the Compare Phase utilizes a previously stored registration image as a reference image to be compared against a query image of the target object. The Fingerprint Engine compares and analyzes features of the reference image and the query image to determine whether the current target object portrayed in the query image is that same object portrayed in the reference image. Specifically, the Fingerprint Engine attempts to determine whether the current target object is the same instance of the physical object that was used to capture the registration image being used as the reference image.

The Fingerprint Engine generates a translucent (or transparent) version of the reference image and provides the translucent image to the end-user. The end-user may utilize the translucent image as a guide as the end-user attempts to align the translucent image displayed on a mobile computer device with a preview image of the target object (from the video feed) concurrently displayed on the mobile computer device.

As the end-user attempts to align the preview image of the target object with the translucent image, the Fingerprint Engine continually determines an alignment score based on a measure of a current extent of alignment between the preview image of the target object with the registered image. Upon determining a current alignment score is within an alignment score threshold range, the Fingerprint Engine prompts the end-user to capture a query image of the target object. By utilizing the translucent image as a guide, there is an increased likelihood that the end-user captures a query image that is nearly aligned with the reference image.

In some embodiments, in order to determine the extent of alignment, the Fingerprint Engine utilizes one or more ML models previously used during the Registration Phase 402. In some embodiments, the one or more ML models of the Registration Phase 402 may be implemented by a mobile computer device software application of the Fingerprint Engine. For example, the Fingerprint Engine may use a blur detection ML model's encoder output as the feature vector to compare the translucent (registered) image's current alignment with the preview of the query image. The Fingerprint Engine may further determine a dice coefficient (as is done during the Registration Phase 402) while determining the extent of alignment of the translucent image and the preview of the query image (i.e. every frame of the video feed from mobile computer device).

As preview images of the target object are received by the Fingerprint Engine via respective frames of the video feed, the Fingerprint Engine further assesses alignment by temporal smoothing. Jitteriness of the respective frames may be present as the end-user manipulates the mobile computer device in an attempt to align the preview images with the translucent image. The result of jitteriness may be a jitter effect in which the prompt to capture the query image may appear instantaneously and then disappear, thereby creating a frustrating user experience.

To avoid the jitter effect, the Fingerprint Engine further processes the respective preview images from the video feed so that their alignment scores are smoothed. The Fingerprint Engine applies temporal smoothing to a smoothing window of a plurality of preview images (i.e. individual frames of the video feed). For example, the smoothing window may be defined as including seven sequential frames. The Fingerprint Engine determines a smooth alignment score by applying a median filter to the individual raw alignment scores of the frames in the smoothing window. The Fingerprint Engine prompts the user to capture the query based on whether a current smooth alignment score falls within query alignment threshold range. Upon being prompted, the end-user captures the query image.

Figure 5:
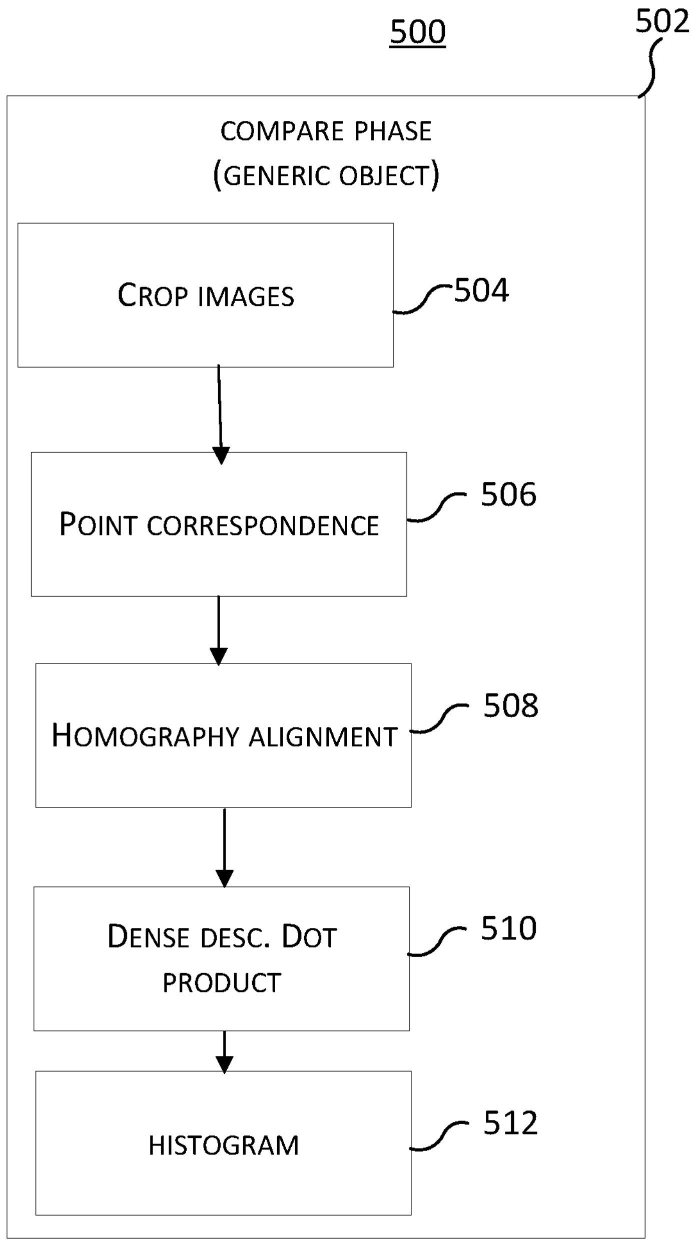
FIG. 5 is a diagram illustrating an exemplary method that may be performed in some embodiments.

As shown in flowchart 500 of FIG. 5, if the Compare Phase 502 involves query image portrays a generic target object, the Fingerprint Engine crops the reference and the query images. (Step 504). The Fingerprint Engine determines point correspondences between the cropped images via a ML mode, such as a Local Feature Matching with Transformers ML (LoFTR) model. (Step 506) The Fingerprint Engine performs homography image alignment. (Step 508) The Fingerprint Engine determines a dense descriptor product of the aligned images. (Step 510) The Fingerprint Engine determines a histogram of the descriptor of dot-products. (Step 512)

In various embodiments, during the Compare Phase 502, the Fingerprint Engine identifies a region of interest in the query image and the reference image. The Fingerprint Engine crops 504 both the images to portray the region of interest. Since the query image was closely aligned when it was captured, there will be a high degree of similarity between the cropped reference and query images. The Fingerprint Engine further aligns the cropped reference and query images according to a Local Feature Matching with Transformers ML (LoFTR) model, which computes matching points 506 between the cropped reference and query images. The Fingerprint Engine rotates and transforms the cropped query image ("transformed query image") according to the matching points such that both the images eventually align perfectly. Embodiments herein are not limited to use of LoFTR models.

The Fingerprint Engine divides both the reference image and the transformed query image according to the same number of block sections. The Fingerprint Engine computes features of each block section of both the reference image and the transformed query image. The Fingerprint Engine compares the features of the same block section from the reference image and the transformed query image.

Comparison of the features from both images by the Fingerprint Engine generates a heatmap that corresponds to each block section, which represents which block sections between the images are highly correlated with each other and which block sections between the images are not. The Fingerprint Engine determines whether there is a match between the images based on a distribution of matches between block sections. If the distribution satisfies a threshold, the Fingerprint Engine determines that execution of the Compare Phase 502 has identified a match between the reference image and the query image and determines that the target object portrayed in the query image is the same instance of the physical object in the registration image used for the reference image.

However, if the query image portrays a defined target object, the Compare Phase 502 involves an additional step where the Fingerprint Engine utilizes a segmentation network to mask out a background region of the query image and the reference image. A mask region is thereby identified within the query image and the reference images. In order to determine a match, the Fingerprint Engine compares features of only those block sections that are located within the mask region.

As already described, the Fingerprint Engine implements a LoFTR model to identify matching points. The Fingerprint Engine executes the LoFTR model by extracting features at a lower range of image resolution. The Fingerprint Engine then executes homography scaling to the resolution of the original image (i.e. resolution of the reference image, resolution of the query image).

Fingerprint Extraction

Controlled lighting conditions are not needed because embodiments of the Fingerprint Engine handle lighting variations. There are large variations in the appearance of fingerprintable surfaces of various types of objects while being captured from a smartphone camera. To ensure that a fingerprint of an object can be consistently utilized regardless of the lighting conditions in the image of that object, a training phase of the Fingerprint Engine is executed to build a feature extraction network based on a SuperPoints network. The training phase includes generation of multiple images of various types of objects and then randomly, artificially modifying the texture of the object in the image—as well as the lighting of the object in the image using Computer Graphics tools.

Stated differently, the training phase involves creating an image training dataset based on a randomized modification of the texture quality and/or lighting conditions of numerous images for different objects—as well different orientations (i.e. perspective view of the image portrayed in the object). An image of an object in the image training dataset may then be represented by numerous versions of that image, where each respective version portrays the same object with variations of texture and lighting. The feature extraction network may then be trained on the created image training dataset.

Figure 6:
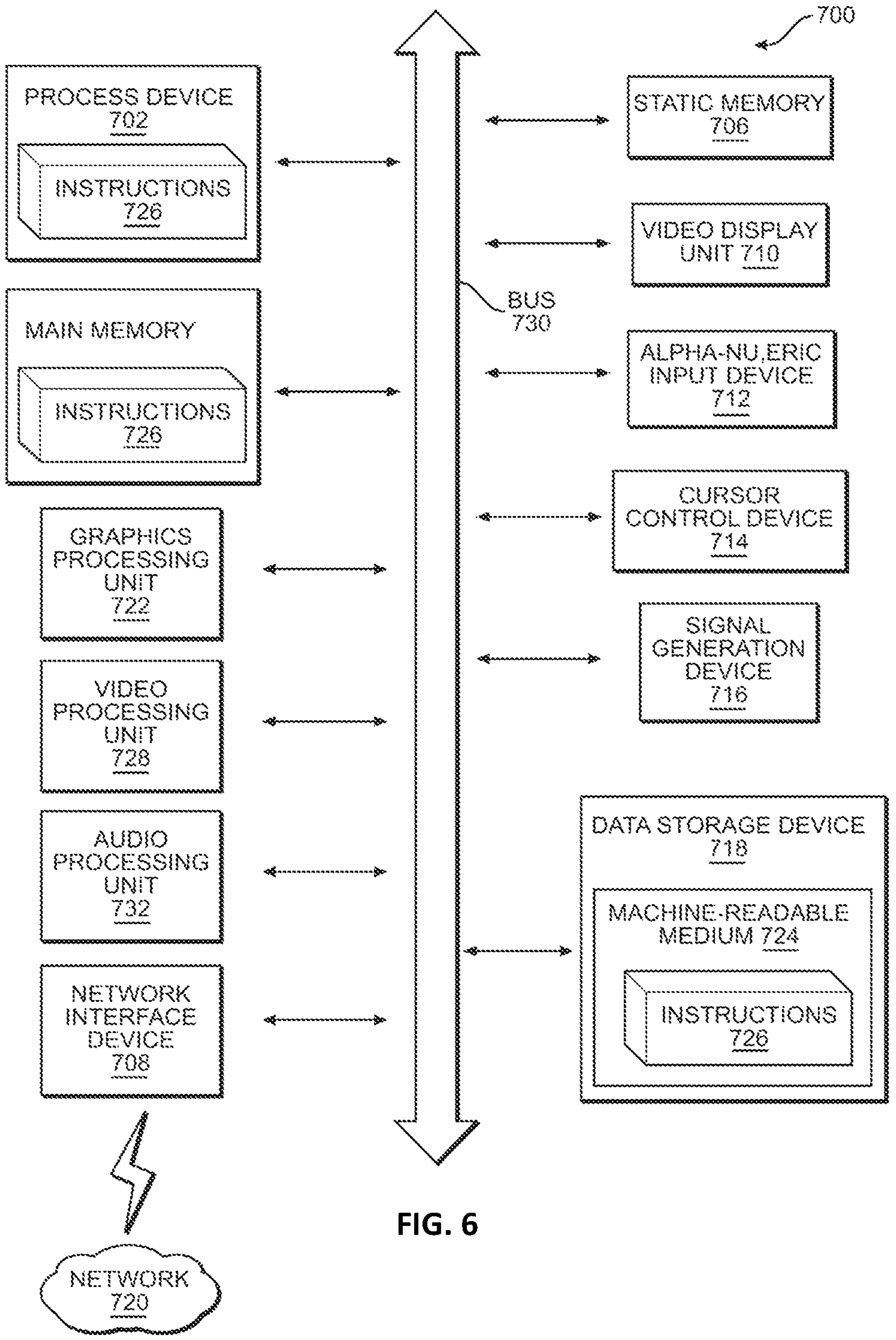
FIG. 6 is a diagram illustrating an exemplary environment in which some embodiments may operate.

FIG. 6 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to the components of a device to perform the disclosure herein. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In this disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
registering a reference image portraying a physical instance of an object, wherein registering the reference image comprises receiving output generated according to a segmentation machine learning model, the output comprising a template based on image content from one or more preview images portraying the physical instance of the object;
capturing a query image portraying a physical instance of a target object;
comparing the reference image and the query image; and
determining an authenticity of the target object based on detecting a match between the reference image and the query image.

2. The computer-implemented method of claim 1, wherein registering the reference image comprises:
receiving a video feed of a plurality of preview images of the object;
for each respective preview image:
determining an extent of blur in the respective preview image;
generating a blur score for the respective preview image;
determining whether the blur score satisfies a blur threshold;
upon determining the blur score satisfies the blur threshold, triggering a prompt to initiate image capture of the object; and
storing the captured image as a registration image of the object.

3. The computer-implemented method of claim 1, further comprising:
receiving a video feed of a plurality of preview images of the object;
as each respective preview image is received, identifying a region of interest in the respective preview image by applying a segmentation machine learning model to the respective preview image;
receiving the template based on the region of interest from the segmentation machine learning model;
upon determining an alignment between the template and the respective preview image satisfies an alignment threshold, triggering a prompt to initiate image capture of the object;
applying blur detection to the captured image; and
storing the captured image as a registration image of the object.

4. The computer-implemented method of claim 1, wherein capturing the query image portraying the physical instance of the target object comprises:
receiving a video feed of a plurality of preview images of the target object;
generating a translucent overlay of the registration image;
as each respective target preview image is received, determining an extent of alignment between the registration image and the respective target preview image;
determining an extent of alignment between the translucent image version of the registration image and the respective target preview image; and
upon determining the extent of alignment satisfies an alignment threshold, triggering a prompt to initiate query image capture of the target object.

5. The computer-implemented method of claim 4, wherein determining the extent of alignment between the registration image and the respective target preview image comprises:
applying temporal smoothing to a window of a plurality of respective target preview images; and
determining an alignment score based on applying temporal smoothing, the alignment score representing a current extent of alignment.

6. The computer-implemented method of claim 1, wherein comparing the reference image and the query image comprises:
cropping the query image and the reference image according to a region of interest portrayed in the query image and the reference image; and
aligning the cropped query image and the cropped reference image according to a Local Feature Matching with Transformers ML (LoFTR) model.

7. The computer-implemented method of claim 6, wherein aligning the cropped query image and the cropped reference image according to the Local Feature Matching with Transformers ML (LoFTR) model comprises:
generating a transformed query image based on one or more matching points identified by the LoFTR model;
dividing the transformed query image and the reference image according to a plurality of corresponding block sections;
extracting features of each block section of the transformed query image and the reference image;
for each block section, comparing features of the respective block section of the transformed query image with features of the corresponding respective block section of the reference image; and
determining the match between the query image and the reference image based on a distribution of similarities amongst the block sections.

8. The computer-implemented method of claim 1, wherein receiving the template occurs prior to capture of the registration image.

9. A system comprising one or more processors, and a non-transitory computer-readable medium including one or more sequences of instructions that, when executed by the one or more processors, cause the system to perform operations comprising:
registering a reference image portraying a physical instance of an object, wherein registering the reference image comprises receiving output generated according to a segmentation machine learning model, the output comprising a template based on image content from one or more preview images portraying the physical instance of the object;
receiving a query image portraying a physical instance of a target object;
comparing the reference image and the query image; and
determining an authenticity of the target object based on detecting a match between the reference image and the query image.

10. The system of claim 9, wherein registering the reference image comprises:
receiving a video feed of a plurality of preview images of the object;
for each respective preview image:
determining an extent of blur in the respective preview image;
generating a blur score for the respective preview image;
determining whether the blur score satisfies a blur threshold;

upon determining the blur score satisfies the blur threshold, triggering a prompt to initiate image capture of the object; and storing the captured image as a registration image of the object.

11. The system of claim 9, wherein the operations further comprise:

receiving a video feed of a plurality of preview images of the object;

as each respective preview image is received, identifying a region of interest in the respective preview image by applying a segmentation machine learning model to the respective preview image;

receiving the template based on the region of interest from the segmentation machine learning model;

upon determining an alignment between the template and the respective preview image satisfies an alignment threshold, triggering a prompt to initiate image capture of the object;

applying blur detection to the captured image; and storing the captured image as a registration image of the object.

12. The system of claim 9, wherein receiving the query image portraying the physical instance of the target object comprises:

receiving a video feed of a plurality of preview images of the target object;

generating a translucent overlay of the registration image;

as each respective target preview image is received, determining an extent of alignment between the registration image and the respective target preview image;

determining an extent of alignment between the translucent image version of the registration image and the respective target preview image; and upon determining the extent of alignment satisfies an alignment threshold, triggering a prompt to initiate query image capture of the target object.

13. The system of claim 12, wherein determining the extent of alignment between the registration image and the respective target preview image comprises:

applying temporal smoothing to a window of a plurality of respective target preview images; and determining an alignment score based on applying temporal smoothing, the alignment score representing a current extent of alignment.

14. The system of claim 9, wherein comparing the reference image and the query image comprises:

cropping the query image and the reference image according to a region of interest portrayed in the query image and the reference image; and aligning the cropped query image and the cropped reference image according to a Local Feature Matching with Transformers ML (LoFTR) model.

15. The system of claim 14, wherein aligning the cropped query image and the cropped reference image according to the Local Feature Matching with Transformers ML (LoFTR) model comprises:

generating a transformed query image based on one or more matching points identified by the LoFTR model;

dividing the transformed query image and the reference image according to a plurality of corresponding block sections;

extracting features of each block section of the transformed query image and the reference image;

for each block section, comparing features of the respective block section of the transformed query image with features of the corresponding respective block section of the reference image; and determining the match between the query image and the reference image based on a distribution of similarities amongst the block sections.

16. The system of claim 9, wherein receiving the template occurs prior to capture of a registration image.

17. The system of claim 9, wherein the one or more preview images comprise a video feed received prior to capture of a registration image.

18. The system of claim 9, wherein the output comprises a segmentation mask defined according to a region of interest portrayed in the one or more preview images.

19. A computer program product comprising a non-transitory computer-readable medium having a computer-readable program code embodied therein to be executed by one or more processors, the program code including instructions to:

register a reference image portraying a physical instance of an object, wherein registering the reference image comprises receiving output generated according to a segmentation machine learning model, the output comprising a template based on image content from one or more preview images portraying the physical instance of the object;

receive a query image portraying a physical instance of a target object;

compare the reference image and the query image; and determine-an authenticity of the target object based on detecting a match between the reference image and the query image.

20. The computer program product of claim 19, further comprising:

receiving a video feed of a plurality of preview images of the object;

as each respective preview image is received, identifying a region of interest in the respective preview image by applying a segmentation machine learning model to the respective preview image;

receiving a template for the region of interest from the segmentation machine learning model;

upon determining an alignment between the template and the respective preview image satisfies an alignment threshold, triggering a prompt to initiate image capture of the object;

applying blur detection to the captured image; and storing the captured image as a registration image of the object.

* * * * *